April 13, 1954

A. S. RICE 2,674,825

MINNOW TRAP

Filed Aug. 7, 1950

Argle S. Rice
INVENTOR.

BY *Clarence A. O'Brien*
*and Harvey B. Jackson*
Attorneys

April 13, 1954

A. S. RICE 2,674,825

MINNOW TRAP

Filed Aug. 7, 1950

Argle S. Rice
INVENTOR.

Patented Apr. 13, 1954

2,674,825

UNITED STATES PATENT OFFICE 2,674,825

MINNOW TRAP

Argle S. Rice, Springfield, Mo.

Application August 7, 1950, Serial No. 178,024

3 Claims. (Cl. 43—56)

This invention comprises novel and useful improvements in a minnow trap and more specifically pertains to a combined minnow trap and receptacle.

The primary object of this invention is to provide an improved minnow trap together with means for combining the same with a receptacle for storing minnow and similar bait in a live condition.

A further object of the invention is to provide an improved minnow trap having a float together with a cage and wherein the cage may be readily adjusted relative to the float or may be entirely withdrawn therefrom as desired.

A still further object of the invention is to provide a combined minnow trap and receptacle wherein the trap is associated with the receptacle in such a manner as to constitute a bait cage within the same and wherein the cage may be readily adjusted vertically with respect to the receptacle.

A still further object of the invention is to provide an improved minnow trap which shall be capable of maintaining a limited quantity of water therein for maintaining minnows or the like in a live condition when the trap is out of the water.

These, together with various ancillary features and objects of the invention, which will later become apparent as the following description proceeds, are attained by the present invention, a preferred embodiment of which has been illustrated, by way of example only, in the accompanying drawings, wherein.

Figure 5:
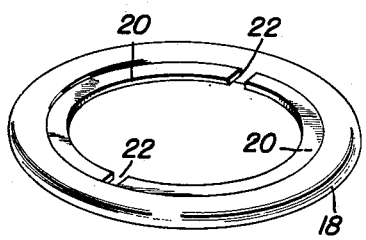
Figure 5 is a perspective view of the annular float which is adjustably and detachably associated with the minnow cage of the trap; and, Figure 6 is a fragmentary perspective view showing in detail the manner in which the gate of the cage is latched to the trap.
Figure 1:
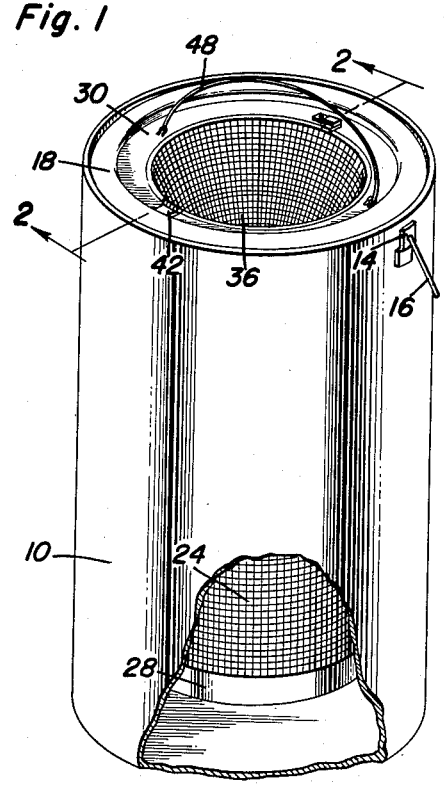
Figure 1 is a perspective view showing one suitable embodiment incorporating therein the principles of the invention, a part of the receptacle being broken away to show the arrangement of the lower end of the minnow trap therein.
Figure 3:
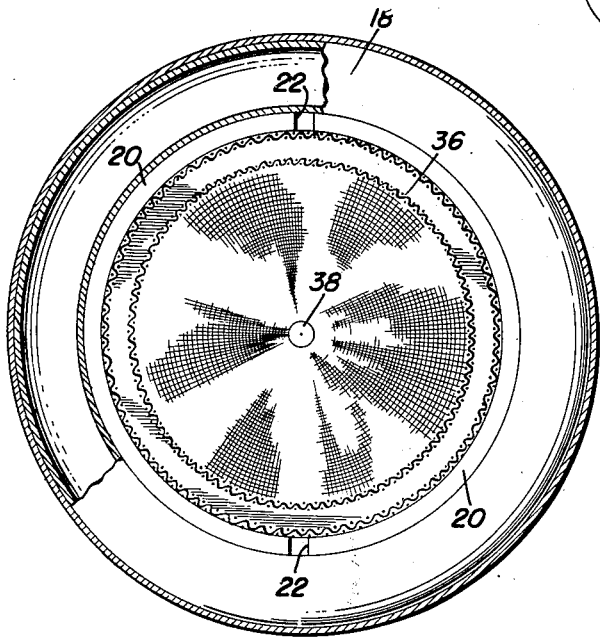
Figure 3 is a horizontal sectional view taken substantially upon the plane indicated by the sectional line 3—3 of Figure 2, a part of the minnow trap being broken away and shown in section.
Figure 2:
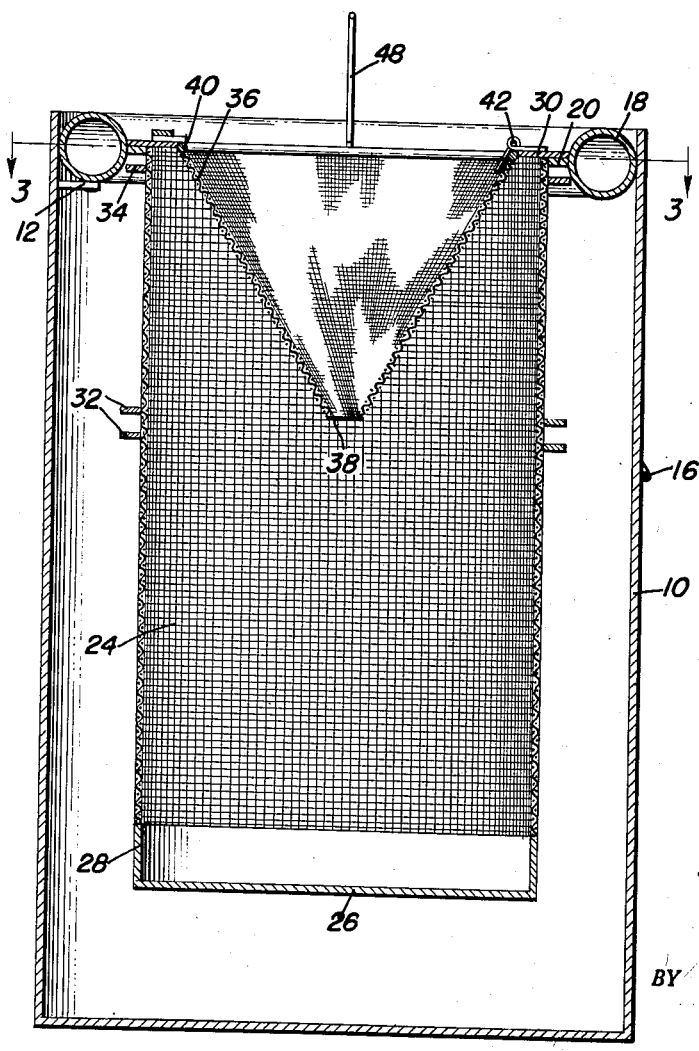
Figure 2 is a vertical transverse sectional view taken substantially upon the plane indicated by the sectional line 2—2 of Figure 1.

Referring now more specifically to the accompanying drawing, wherein like numerals designate similar parts throughout the various views, it will be seen by particular reference to Figures 1 and 2, that the principles of the present invention have been embodied in a combined receptacle and trap for catching and storing minnows, and conveniently comprises a container 10 of sheet metal or any other suitable material and which is provided with an open upper end, together with a plurality of inwardly extending supporting brackets or lugs 12 which are formed upon the inside surface of the side walls adjacent to the upper ends of the same. The container 10 is provided with a customary supporting ear 14 to which is swiveled a bail 16 for carrying the device.

Removably seated upon the support brackets 12 of the container 10 and received within the container is an improved minnow trap forming a part of the present invention. This trap includes separable float and cage members.

The float, as shown more particularly in Figure 1, comprises an annular, hollow, toroidal body 18 of any suitable material and size, but preferably of an outside diameter sufficient to be loosely received within the container 10 and to rest upon the support brackets 12 therein. Fixedly secured to the inner surface of the float 18 are a pair of arcuate or semi-circular inwardly extending flanges 20 which are welded or otherwise fixedly secured to the float and whose ends are spaced from each other to provide slots 22 therebetween.

The cage member of the minnow trap consists of a cylindrical reticulated cage or sleeve 24 which is open at its upper end, and is provided with a bottom portion in the form of an imperforate bottom wall 26 having an imperforate annular upstanding rim 28. The lower end of the cage 24 is secured or attached in any desired manner to the upstanding rim 28.

Figure 6:
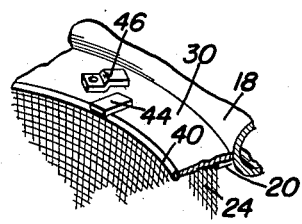

At its upper end, the cage is open and is provided with an annular flange 30, which as shown in Figures 2 and 6, extends inwardly and outwardly of the top of the cage. The outer portion of the flange 30 is adapted to rest upon the rim 20 when the cage is slidably received in the annular float and lowered to its lowermost position as shown in Figure 2.

At vertically spaced points along its exterior surface, the cage 24 is provided with sets of lugs such as those indicated at 32 and 34, which lugs are slidable through the above mentioned notches 22 so that when these lugs register with the notches the cage may be slid into or out of the annular float. Upon rotation of the cage, the selected lugs will rest upon the rim 20 to support thereby the cage in vertically adjusted position with respect to the float.

Figure 4:
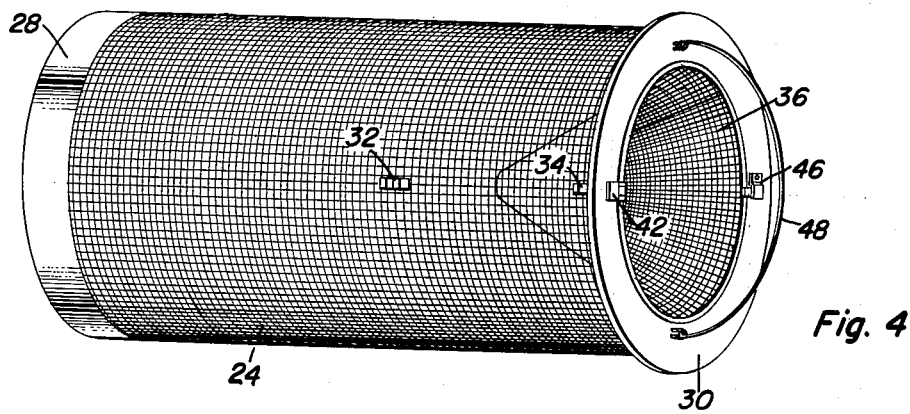
Figure 4 is a perspective view of the minnow trap and cage forming a part of the invention.

A gate is provided to complete the trap and form an entrance and cover for the cage 24. This gate comprises a reticulated conical funnel 36 having a smaller, open lower end 38 constituting an inlet into the cage and having about its upper larger end an annular rim or ring 40. At one side, the rim 40 of the gate 36 is hinged to the rim 30 of the cage as at 42, and at its opposite side, as shown in Figure 6, is provided with a fixedly secured laterally outwardly extending lug or bracket 44 which is adapted to overlie and rest upon the rim 30. A pivoted latch 46 secured to the rim 30 is adapted to be moved to an overlying position with respect to the lug 44 to hold or clamp the same downwardly upon the rim 30, whereby the hinged gate may be secured in its closed position. A bail or handle 48 is hinged to the rim 30, as shown in Figures 1 and 4, and permits carrying of the trap or cage, turning the same to properly locate the lugs 32 or 34 with respect to the notches 22, and facilitates the vertical adjustment of the cage in the annular float and removal of the cage from the container 10.

It will be apparent that the cage can be readily adjusted in the annular float to thereby bury the height of the cage when seated in the container 10. By means of the float the cage may be placed in a body of water to constitute a minnow trap. The imperforate bottom and side walls of the cage enable a small quantity of water to be retained therein to keep the bait in live condition.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A minnow trap comprising a reticulated cylindrical cage having an open upper end, an outwardly extending annular flange secured to the outer surface of said cage and surrounding said open upper end, radially extending lugs secured to the outer surface of said cage and spaced below said outwardly extending annular flange, and an annular float having an inwardly extending annular flange thereon, said inwardly extending flange having spaced notches therein, the circumference of the inner edge of said float flange being substantially equal to the outer circumference of said cage, said float concentrically and slidably surrounding said cage, said notches permitting said float to slide over said lugs when said notches are aligned with said lugs, said lugs retaining said float on said cage when the float flange is rotated so that the notches are out of alignment with the lugs.

2. The combination of claim 1 wherein said lugs are in vertically aligned sets on opposite sides of said cage, one set of lugs being disposed immediately beneath said outwardly extending annular flange for retaining the inwardly extending annular flange of the float between the lugs of the said set.

3. A minnow trap construction comprising an outer imperforate, cylindrical container having an open upper end, and an inner, reticulated cylindrical cage having an open upper end disposed concentrically therein, said inner cage and said outer container providing an annular space therebetween, an annular float concentrically and slidably surrounding said cage, means on said outer container projecting into the annular space between said container and said float engaging said float and supporting said float within said container, said cage including an outwardly extending annular flange secured to its outer surface and surrounding the upper end thereof, and radially extending lugs secured to the outer surface of said cage and spaced below said outwardly extending annular flange, said float having an inwardly extending annular flange thereon, said inwardly extending float flange having spaced notches therein, the circumference of the inner edge of said float flange being substantially equal to the outer circumference of said cage, said notches permitting said float to slide over said lugs when said notches are aligned with said lugs, the inwardly extending flange of the float when rotated being adapted to be disposed beneath and out of alignment with the top radially extending lugs whereby the reticulated cage may be supported by the float when the float is engaged by the said supporting means projecting within the container.

References Cited in the file of this patent

UNITED STATES PATENTS

| Number | Name | Date |
|---|---|---|
| 299,690 | Sherwood | June 3, 1884 |
| 401,493 | Gundermann | Apr. 16, 1889 |
| 504,526 | Hemp | Sept. 5, 1893 |
| 661,093 | Warren | Nov. 6, 1900 |
| 769,874 | Paar | Sept. 13, 1904 |
| 879,370 | Dennison | Feb. 18, 1908 |
| 1,709,424 | Zohe | Apr. 16, 1929 |
| 2,180,160 | Nelson | Dec. 5, 1939 |
| 2,297,843 | Sharpnack | Oct. 6, 1942 |
| 2,538,462 | Klatt | Jan. 16, 1951 |